United States Patent [19]
Massey

[11] 4,083,574
[45] Apr. 11, 1978

[54] BOOSTER DOLLY

[76] Inventor: Cecil D. Massey, 16510 North Hwy. 3, Webster, Tex. 77598

[21] Appl. No.: 723,751

[22] Filed: Sep. 16, 1976

[51] Int. Cl.$^2$ .............................................. B60S 13/00
[52] U.S. Cl. ............................ 280/47.15; 280/79.1 A; 280/767
[58] Field of Search ............ 280/767, 79.1 R, 79.1 A, 280/47.15

[56] References Cited

U.S. PATENT DOCUMENTS

| 1,446,488 | 2/1923 | Vatter | 280/47.15 |
| 3,746,365 | 7/1973 | Kirschbaum | 280/767 |

FOREIGN PATENT DOCUMENTS

| 825,639 | 12/1951 | Germany | 280/767 |

*Primary Examiner*—Robert R. Song
*Attorney, Agent, or Firm*—Donald Gunn

[57] ABSTRACT

A booster dolly for use by tow trucks is disclosed. The booster dolly is useful where a blowout or wheel bearing failure in a trailer has occurred as might happen to submersible boat trailers. The apparatus incorporates in the preferred embodiment an axle brace which supports slidable mounted V-shaped pillow blocks. They are moved along the axle brace to locations where they then support the axle of the failed trailer thereabove. One of the two pillow blocks stands taller than the other and it is provided with a downwardly extending portion which adjustably connects with a tandem brace. The tandem brace is adjustably maintained at some distance below the axle brace. The tandem brace is drilled with appropriate mounting openings to receive a set of dolly wheels thereon, the dolly wheels mounted on removable stub axles and being pin fixed in position. This apparatus enables a failed trailer to be carried on the dolly.

8 Claims, 2 Drawing Figures

BOOSTER DOLLY

BACKGROUND OF THE DISCLOSURE

Along the highways running to and from bodies of water where many people tow sailboats or motorboats for recreation, it is a common sight to see boat tralers along the side of the road which have failed. The owner will tow the trailer to a recreational place where the boat on the trailer is launched. Typically, when the boat is launched from the trailer, the trailer is backed by the owner's vehicle into the water. The trailer is tipped, or the boat is released from the trailer in some other fashion. The boat then is placed in the water and is used until retrieved. Retrieval of the boat again involves backing the trailer into the water at which time the boat is winched up on to the trailer. The boat is made fast on the trailer and the owner then drives away.

It is normal for the owner to back his trailer into the water twice on each use of his boat. As a consequence, the running gear of the trailer is submerged or substantially so twice for each use of the boat. The submergence of the trailer exposes the running gear of the trailer to water penetration and consequential rust and other damage which arises from exposure to water. This is particularly damaging because the water will typically enter the bearings in the wheels of the trailer and will eventually cause the bearings to fail.

Bearing failure is noramlly a catastrophic event for a trailer owner. It typically will occur at the end of a holiday or weekend period of relaxation where the owner is returning to his home in his vehicle towing the boat mounted on the trailer. Quite often, most repair facilities are closed and indeed, the failure will typically occur out of the city where the owner dwells. When these failures occur, they are catastrophic in the sense that they prevent the owner from returning home and they force him to stop, thereby jeopardizing the boat and trailer when they must be left by the side of the road. Because of the expense and danger in leaving them at the side of the road, many efforts have been made heretofore to tow the failed trailer to a safe location. However, such tow attempts have not met with overwhelming success.

The apparatus which is disclosed herein overcomes the problems described above. That is to say, the disclosed and claimed apparatus is a structure which is intended to provide emergency aid and assistance to the owner of a failed trailer. It enables the owner to level his boat so that it is road worthy and appropriately balanced for high speed travel. Moreover, it takes the load off the failed wheel where the failure typically occurs as a result of bearing seizure. When the bearings seize, a catastrophic condition has been reached at which the bearings, the surrounding housing, the axle or shaft which supports the wheel or other equipment become extremely hot and unable to thereafter function. They sometimes become so hot that the metal looses its strength and wilts, bends, or otherwise warps. Quite often, the boat owner will find his trailer wheel folded askew where the wheel is no longer able to rotate presuming even that he can cool the wheel bearings. Sometimes, fires will occur as a result of the overheating although there is ordinarily very little structure thereby to support combustion.

The apparatus of the present invention overcomes these problems and particularly provides a booster dolly. The booster dolly enables the axle to be supported at the requisite generally horizontal posture required for high speed travel, and moreover, it lifts the load from the failed wheel bearing and wheel assembly. The wheel is lifted off the ground. Quite often, this is not even necessary because the wheel bearing assembly, on failure, will cause the wheel to fold up or even to break away from the trailer. In any case, and without regard to how the failure occurs, the booster dolly of the present invention overcomes these problems in that it is a portable dolly suitably carried by a wrecker service which can be conveniently affixed and later removed from a failed boat trailer.

SUMMARY OF THE DISCLOSURE

The apparatus solves the problems alluded to above, and provides a booster dolly conveniently carried by a wrecker service. It includes an axle brace which supports a pair of movable V-shaped locks. The blocks adjust lengthwise of the axle brace. One of the V-shaped blocks stands taller than the other and it extends downwardly and is releasably connected to a tandem brace. The tandem brace is a lengthwise frame member which is approximately perpendicular to the axle brace but which is carried below it. It includes a pair of openings drilled in it to receive stub shafts or axles for a pair of free wheeling rotatable dolly wheels. The axle brace and the tandem brace are arranged relative to one another so that they are adjustable in relative position to accommodate boat trailers of different sizes and different constructions.

DESCRIPTION OF THE PREFERRED EMBODIMENT

Figure 1:
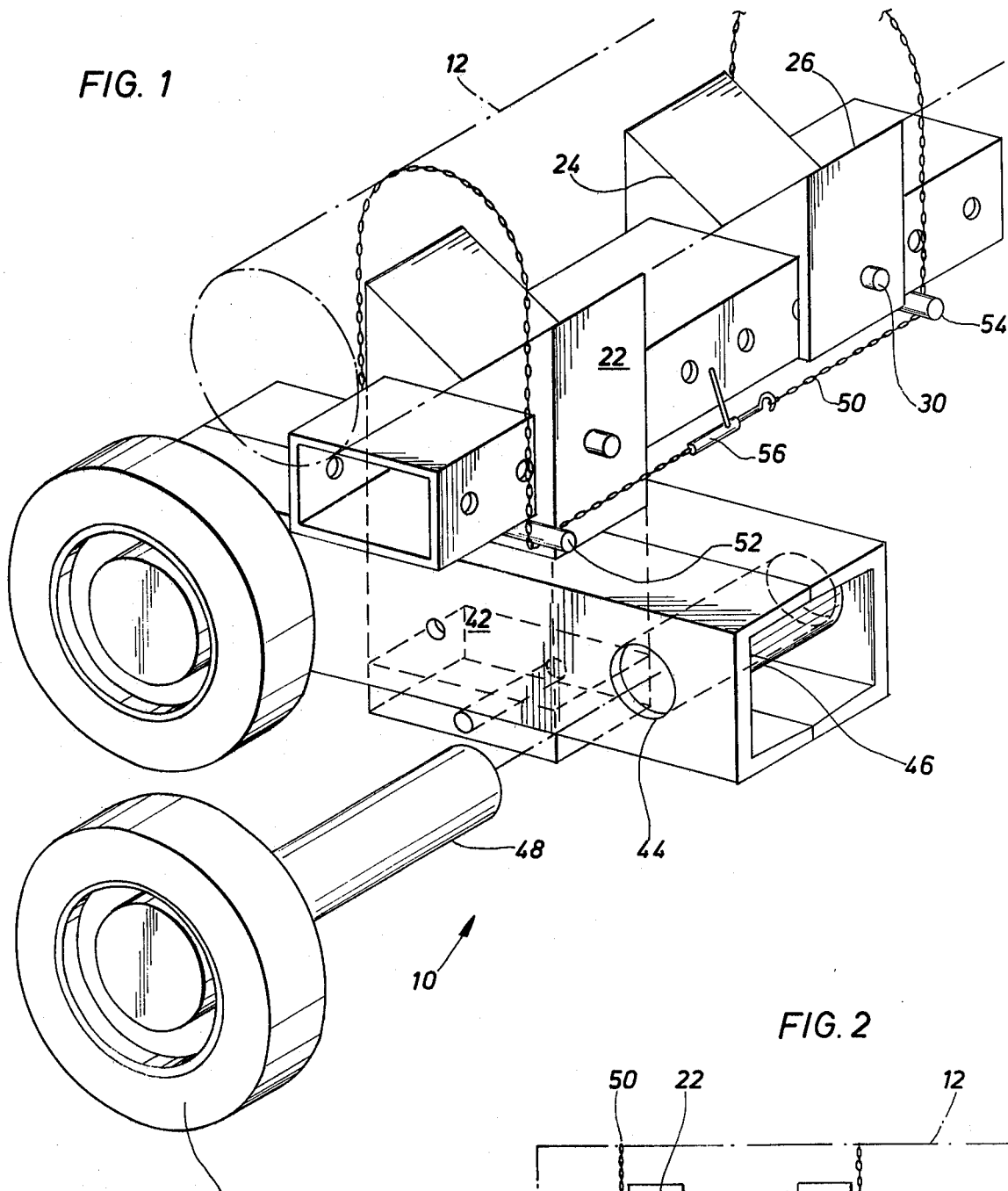
FIG. 1 is perspective view of the booster dolly of the present disclosure where the axle of a failed boat trailer is shown in dotted line.

In the drawings, the numeral 10 identifies the booster dolly of the present invention. A boat of some construction is located above it, the boat being omitted and only trailer axle being indicated by the ghost line at 12. The axle 12 can be of any appropriate or construction including split axles, solid axles which span the trailer structure, rectangular or box frame members which support stub axles and so on. While the precise construction of the trailer may vary, it will be appreciated and understood that there is a sufficient length of axle protruding from the framework of the trailer to enable the booster dolly 10 to be placed under it to thereby support the trailer. The method of installation will be discussed hereinafter.

Figure 2:
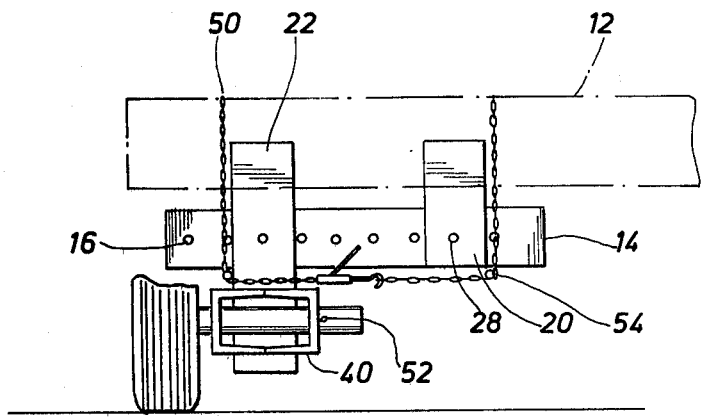
FIG. 2 is a back view of the apparatus of the present disclosure installed on a trailer and supporting the weight of the trailer by connecting to the axle of the trailer.

As shown in FIG. 2 of the drawings, the apparatus includes an axle brace 14 which is formed of a rectangular or box construction which is open axially along its length. It has a number of openings drilled therein identified by the numeral 16. They are to receive lock pins as will be described. The axle brace 14 is fairly long, sufficiently long relative to its height and width to enable it to extend parallel to and just below the axle of a failed trailer. It serves as a support member for a first V-shaped pillow block 20. A smilar pillow block 22 is incorporated and supported on the axle brace 14. The pillow block 20 is shown in FIG. 1 of the drawings to incorporate angled surfaces 24 and 26. These come together to define a V-shaped resting area. The axle 12 rests in the V. The axle 12 is supported by the block 20. The pillow block 20 is adjustable lengthwise of the axle brace 14. It incorporates a drilled opening 28 which aligns with one of the drilled holes 16 in the axle brace. A pin 30 shown in FIG. 1 is inserted to lock the pillow block 20 at a specified lengthwise position. This position may vary depending on the particular application of the booster dolly. That is to say, the block 20 can be moved by hand upon removal of the pin 30 to a required location. The pin 30 preferably is a friction pin which is slightly tapered so that it may be hammered home. When it is hammered in to the openings, it will hold and not accidentally release. Only a light tapping force is adequate to normally position and fasten the pin. This holds the equipment together during use to prevent it from coming apart.

As will be observed, the axle 12 is supported by two similar V-shaped pillow blocks. The second is generally identified by the numeral 22. It stands taller than the first although the upper parts thereof are constructed in similar fashion. Thus, it also supports the axle which is above the axle brace 14. The two together assure that the axle brace is roughly parallel to the axle itself. When they are parallel, they are able to support the boat trailer. They are slidable relative to one another, both the blocks 20 and 22 being slidably attached to the axle brace 14 in like fashion. Thus, lengthwise stringers which comprise the framework of the trailer are avoided and do not interfere with use by virtue of their position on the lower side of the trailer.

The block 22 stands taller than the block 20. This enables the lower portion of it to extend downwardly and pass through a central rectangular opening formed in a tandem brace 40. The tandem brace 40 is approximately perpendicular to the axle brace 14. It is pin connected by inserting a pin similar to those shown before into an opening 42 in the side of the tandem brace. The pin which was inserted again is held by friction in like fashion to the pin 30 previously described. The block 22 is provided with spaced openings located along a vertical line which align with the opening 42 to enable the two to be pin connected. Preferably, opposite faces of the block 22 are drilled and opposite faces of the tandem brace are likewise drilled. In other words, four openings preferably align with one another so that a single pin is inserted through all four openings. Alternatively, separate pins can be used on the right and left side of the tandem brace 40. As viewed in FIG. 2, this means that a pin can be inserted from the right and one from the left. This enables the tandem brace 40 to be adjusted in vertical location relative to the axle brace 14. It will be appreciated that there is some variation in trailer wheel size and hence, some variation in the intended or normal height above the ground. As a consequence, the axle level is adjusted to be almost perfectly level. At the time of the installation of the temporarily used booster dolly, the vertical variation in location of the axle brace accommodates variations in trailer construction.

The tandem brace 40 is drilled with a large opening at 44 and a matching opening is formed on the opposite side. A sleeve 46 spans the box like tandem brace 40. It extends from opening to opening. It serves as a mounting sleeve or socket for a stub shaft 48 which is appended to a dolly wheel 50. The wheel 50 of course is mounted for free wheel rotation on the shaft 48. The shaft 48 normally does not rotate, but rather, it serves as a mounting apparatus whereby the dolly wheel is fixed to the tandem brace 40. The stub shaft 48 is thus inserted fully through the sleeve 46 and protrudes on the opposite side. It is preferably drilled so that a cotter pin 52 (FIG. 2) is inserted therethrough to lock the stub axle in position. It cannot thereafter escape. Of course, the stub axle 48 transfers the weight of the boat trailer to the wheel 50.

Preferably, the tandem brace 40 has suitable openings at each end to mount two dolly wheels. They are spaced apart. The gap between the two wheels is sufficient to receive the trailer wheel in the event that it remains in the intended plane, and this leaves one of the wheels in front of the trailer wheel and the other to the rear. This provides adequate support for the weight placed on the booster dolly 10.

To assure a safe connection of the apparatus to the boat trailer, a chain 50 is looped over the trailer axle and beneath a fixed pin or post 52. A similar pin or post 54 is also incorporated. As will be observed, they are preferably affixed to the V-shaped pillow blocks 20 and 22. They are located so they serve as a binding post for the chain 50. The chain is thus looped over the axle and around the binding post. The chain is actually a single loop of chain which is caught by the binding post 52 and 54. The loop of the chain is closed by means of a turnbuckle 56 which is selectively tightened to pull the chain tight and thereby prevent the booster dolly from accidentally separating from the axle of the failed boat trailer.

The many adjustments in the apparatus accommodate variations in size and construction of the boat trailer. The first block 20 which supports the axle of the trailer is movable along the axle brace 14. The same is true of the second supportive block 22. They are both selectively fixed in position, but enabled for separate movement, by the use of removable pins inserted into drilled openings. The second pillow block 22 stands sufficiently tall to enable it to extend perpendicularly through a central opening in the tandem brace 40. The height of the apparatus is adjusted by insertion and removal of a pin placed in the opening 42 which passes through a suitable opening in the lower portions of the vertical block 22. This provides another mode of adjustment.

The dolly wheels are shown in FIG. 1 to be separate and independently removable. However, they can be formed together as a unit, and indeed, are commercially available from a known manufacturer as a unit. In the commercially available construction, the two dolly wheels are joined by a lengthwise frame member which connects between both stub axles and which, if installed in this apparatus, would add a horizontal frame member immediately adjacent to the brace 40.

In use, the device is installed in the following fashion. The failed trailer is jacked up to a point where the axle is approximately horizontal. The tire on the failed wheel is removed or not depending on how much interference it provides. The axle brace 14 is positioned paralled to the axle 12 and then the pillow blocks 20 and 22 are located. The pillow blocks are pinned in position. The chain 50 is looped over the axle 12 and both ends are brought together and joined by the turnbuckle 56 which is then adjustably tightened. The chain 50 is looped over the axle 12 and both ends are brought together and joined by the turn buckle 56 which is then adjustably tightened to pull the chain reasonably tight. A pin is inserted in the opening 42 to adjust the axle brace at the requisit elevation over the pavement or ground. The dolly wheel 50 is anchored in position by inserting the shaft 48 through the appropriate opening in the brace 40 and when it protrudes on the other side, a cotter pin 52 is fixed in location to anchor the dolly wheel 50. This prevents it from coming free of the dolly 10. At this juncture, the apparatus is ready to use. The jack mechanism is removed from under the boat trailer and the owner is then able to drive away. The damaged wheel bearing assembly is rested because no load is placed on it and more importantly, the wheel is elevated above the ground level so that it does not rotate.

After the tow is completed, the dolly 10 is removed by freeing the chain 50. The chain 50 is removed whereupon the trailer is raised with a jack and the dolly 10 is pulled from underneath the trailer. The enables the wrecker service to leave the boat trailer at a safe location where the owner can either repair it or otherwise tend to his equipment without fear of theft, pilferage or vandalism. It avoids the delimma of leaving expensive boat and trailer equipment on the roadside.

The foregoing is directed to the preferred embodiment but the scope thereof is determined by the claims which follows.

I claim:

1. A booster dolly for use with a boat trailer where a wheel assembly of the boat trailer has failed, comprising a booster assembly including a first support means which supports the weight of the trailer by supporting the boat trailer axle which first support means is adjustable to move into a supportive position for the boat trailer axle and said first support means comprises a generally horizontal structural member and at least a pair of separable pillow blocks movably mounted thereon to receive the weight of the boat trailer, and a second means structurally connected to said first support means which second means includes a second support means adapted to receive and connect to a dolly wheel and which places the weight of the trailer on the dolly wheel.

2. The apparatus of claim 1 wherein said second support means is a box-like structural member, and has a pair of opposite walls which walls are parallel and said openings are duplicated in said walls at a common relative height therein to define a generally horizontal socket for the stub shafts of the dolly wheels.

3. The apparatus of claim 2 including means for locking said stub shaft in said socket.

4. The apparatus of claim 1 wherein said first support means is a generally horizontal structural member, and further including at least a pair of slidably mounted pillow blocks movably positioned on said structural member, and said structural member is releasably fixed to said pillow blocks by a removable fastener means.

5. The apparatus of claim 4 wherein said fastener means includes a removable pin insertable into a set of aligned openings in said structural member and matching openings in said pillow blocks.

6. The apparatus of claim 5 including a V-shaped surface on the top side of said pillow blocks.

7. The apparatus of claim 4 including a third means for adjustably fixing the vertical clearance between said first means and said second means.

8. The apparatus of claim 7 wherein said third means comprises an adjustable and movable vertically extending structural frame member connecting between said generally horizontal structural member and said second second means which is comprised of a generally horizontal frame member at right angles to said structural frame member.

* * * * *